Oct. 24, 1933.  C. H. BREERWOOD  1,931,921
MANUFACTURE OF CEMENT
Filed Dec. 1, 1932
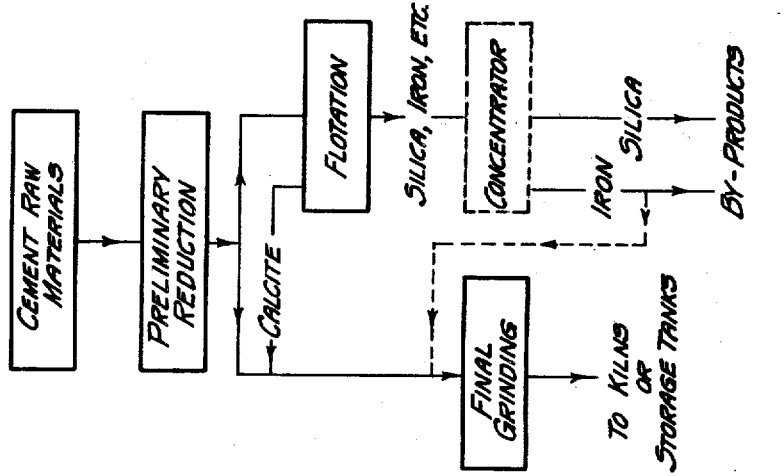
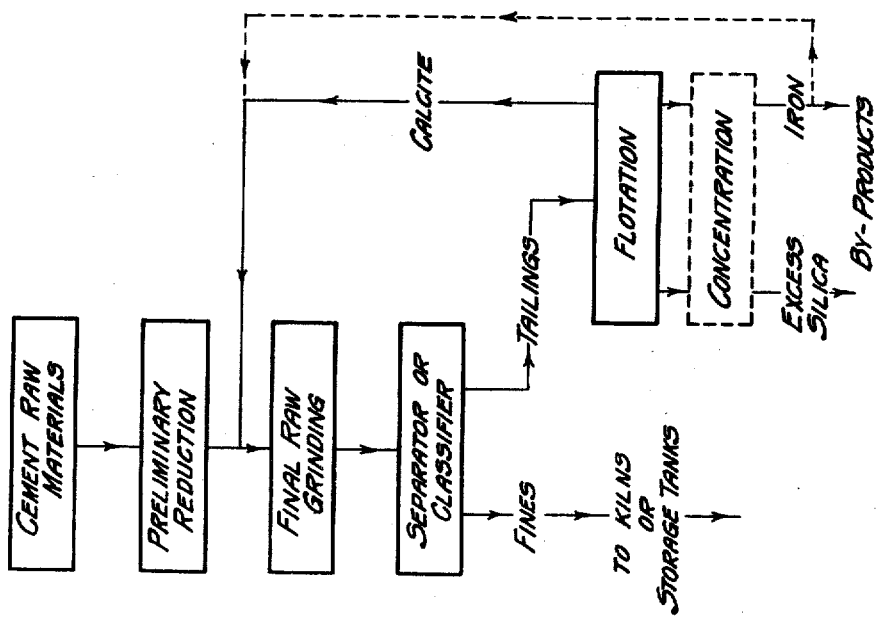
INVENTOR
BY *C. H. BREERWOOD*
ATTORNEYS Patented Oct. 24, 1933

1,931,921

UNITED STATES PATENT OFFICE 1,931,921

MANUFACTURE OF CEMENT

Charles H. Breerwood, Narberth, Pa., assignor to Valley Forge Cement Company, a corporation of Pennsylvania Application December 1, 1932. Serial No. 645,203

16 Claims. (Cl. 106—25)

This invention relates to the manufacture of cement, specifically standard Portland cement and special modifications thereof. More particularly, the invention is concerned with a new method of preparing the raw cement materials to produce a mixture suitable for burning, this method making it possible to control and vary the composition of the final mixture and thus produce cements of different composition by synthesis. The new method thus makes it possible to produce final mixtures of the desired analysis from available inferior materials which contain all the essential constituents but in unsuitable proportions, without adding thereto materials obtained from outside sources.

The new method is based on the principle of separating the constituents of the raw materials during the course of their preparation whereby a variation in the raw material analysis from the desired analysis of the final mixture, and taking the form either of an excess or deficiency of certain essential ingredients, can be corrected. In a more specific sense, the invention comprehends the employment of new methods for the preparation of the raw materials, according to which excessive quantities of an essential element of the final mixture to be burned are discarded or deficiencies in an essential ingredient made up, the separation of the ingredients in accordance with the new method making available quantities of an individual ingredient for disposal in either of the ways mentioned. The method of the invention further comprehends the use of flotation for the separation of certain of the essential ingredients of the raw cement material mixture and the utilization of the principle of separation of the ingredients in connection with the grinding of the materials under such conditions that a substantial reduction in the grinding cost is afforded.

In the manufacture of cement from rock, as now carried on, it is necessary to employ available rock which usually contains all the essential constituents of the final mixture to be burned but having those ingredients present in proportions departing from the desired analysis of the final mixture. Usually the variation in the raw materials from the desired composition takes the form of a deficiency in certain constituents, and this is made up by adding calcite, for example, if the lime is deficient, and clay or shale if the deficiency is of silica and alumina. This practice is not only expensive, in some cases to the point where it is uneconomical, but it also has the serious objection, that such admixtures do not correct the faulty silica-iron-alumina and silica-lime ratios of the original material, and thus does not give the producer the opportunity of exercising control to keep the analysis of the final mixture within the required limits. As a consequence, much rock, which is satisfactory in the respect that it contains all the essential ingredients, cannot be used in the manufacture of cement, and the present tendency in the industry toward the production of cements of higher strengths and greater uniformity has further restricted the rock supplies which can be used.

The present invention is directed to the provision of a method of preparing the raw cement materials which offers numerous important advantages over the methods heretofore used, in that, among other things, it permits close control of the quantities and ratios of all the important constituents of the final mixture and thus makes it possible to approach closely and, in some cases, actually attain a mixture of theoretically correct analysis on a molecular basis.

Such control has long been desired in the manufacture of cement but has generally been thought impossible of achievement because of variation in the "combined forms" of the ingredients involved. By the new method, however, the cement chemist can exercise such control over the composition of the final mixture, that he can produce true Portland cement of the best quality and thorough uniformity from grades of rock now considered inferior, and can also employ rock which is now considered unusable without adding materials from outside sources. He can produce from such rocks alone a true Portland cement of high tri-calcium silicate content or lime saturation, having unusually good characteristics with respect to quality and strength as compared with the best Portland cements made from superior raw materials, and he can also produce cement of low tri-calcium silicate and high di-calcium silicate which will carry a high water ratio without substantial impairment of its crushing or tensile strength. The process also enables the chemist to produce from such rocks alone various special cements, such as those known as "high" alumina and iron cements, and others presently manufactured for specific uses, and he can produce these standard and special cements from the same original materials without additions to modify the composition.

While the provision of control of the analysis of the mixture to be burned is perhaps the most important feature of the invention since it makes possible the production by synthesis of cements of the best grades from materials heretofore considered inferior or useless, the new method offers a further advantage in that it effects a substantial reduction in cost of the process of manufacture. This is brought about by the elimination from the mixture of the excess of free silica in the form of quartz or sand, for example, which is relatively hard and difficult to grind and also does not combine readily at normal kiln temperatures. Because of this failure of free silica to combine chemically, some of the silica heretofore believed to be present in the clinker in combined condition is actually present in the finely divided free state and as an inert part of the clinker. The presence of this material makes the clinker hard to grind and, in addition, the failure of the free silica to combine chemically introduces an error in the raw mixture calculations, since the chemist, in order to avoid unsoundness in the final product, is forced to reduce the lime ratio. The result is that lime saturation in the clinker is not attained and the cement made from it is, therefore, inferior in strength and nearly always lacking in uniformity. The possibility of eliminating the excessive free silica by the new method thus not only reduces the cost of grinding the raw materials and the clinker and the fuel cost, but also makes it possible to produce a cement of better quality.

In addition to the feature of utilizing the raw material itself as a source of supply of essential constituents of the final mixture to be burned, which can be disposed of to alter the analysis of the original material to that desired, my invention may be considered in another sense as involving the application of the principle of flotation to the cement industry. Flotation, as a process, is of course well known and it has been widely used in the treatment of low grade ores to recover the metal-bearing material therefrom. So far as I am aware, flotation has not been commercially used heretofore in the separation of essential constituents of a raw material mixture to provide quantities of such constituents which may be employed in producing a mixture of a selected analysis, and, in particular, its application to the cement industry has not been suggested up to the present.

I have found that flotation may be successfully used at a relatively low cost in the treatment of cement raw materials to separate the lime-bearing ingredients from the silica, iron, and alumina, and the operation may be carried on under such conditions that the calcite is floated and the other ingredients depressed to remain in the cells as residue. Flotation thus makes practicable the separation of the essential constituents of the original material necessary in exercising control of the analysis of the mixture to be burned, and it can be carried on in connection with the grinding of the material under such conditions that a saving in grinding costs is made, more than sufficient to cover the cost of practicing the flotation process.

While the utility of the new method is not limited to raw materials of any particular type, its application can best be understood by an explanation of its use in connection with raw materials now employed in certain cement-producing areas of the United States. For this purpose, its use in connection with such rock as is available in the Lehigh Valley district will be explained in detail.

In this district, the cement rock, with possible minor exceptions, is argillaceous limestone which in its natural state is usually somewhat deficient in calcium carbonate for cement manufacture. It is generally thought that in most instances this rock contains lime, silica, alumina, and iron in natural combined forms, but free silica exists usually in excessive quantities, some of which, in the form of quartz, can be eliminated in the quarrying, but most of which is not removable by methods now commercially practiced.

I have discovered that, contrary to the generally accepted belief, many of the so-called combined materials are not chemically combined but are in reality physically bonded in finely divided condition. Chemical and microscopic analyses have shown that in many cases, these "combined forms" are actually free calcite, free silica, free alumina, and free iron in relatively fine condition and bonded together, certain of the true chemically combined forms also being present in some cases. Originally, in a few locations in the Lehigh Valley district, there were supplies of natural cement rock the composition of which was suitable for burning without modification to produce standard Portland cement, but these supplies are now generally thought to be exhausted and it is the almost universal practice in this district to add to the cement raw materials quantities of "Anneville" limestone which is an almost pure calcite. While this practice may be carried to the point of increasing the lime content to the desired proximate analysis, it is not possible by the addition of limestone to control the ultimate analysis accurately, in that the ratios between the various constituents are not materially corrected and are not controllable in this way within the proper limits. Thus cements made in this manner are not only likely to be deficient in uniformity and strength but the cost is increased by the cost of the limestone, which may add from five cents to twenty cents a barrel to the cost of producing Portland cement in this section. As a result of the excessive costs and other disadvantages arising from the use of additional limestone, a number of plants in this district have been abandoned in recent years as the better grades of rock became exhausted and prescribed standards of quality of the cement were raised and could not be reached with the materials available.

In other districts, as is well known, the natural materials include a greater calcium carbonate content than is permissible in cement manufacture and in such cases, it is customary to add clays or shales to the raw material mixture. This procedure results in an increase in cost and various mechanical difficulties are encountered in the handling and control of the materials introduced, these difficulties being more serious in the case of clay.

In the application of my invention to the treatment of the cement rock usually employed in the Lehigh Valley district, the excess of free silica, such as quartz, is removed and discarded before the rock is reduced to ultimate fineness so that power will not be wasted in grinding it. To this end, preferably a portion only of the material is removed during the process of reducing the rock and the constituents thereof are segregated so that the free silica can be discarded to correct the ratio and the limestone recovered can be returned to the raw materials undergoing final grinding in such amounts as to increase the proportion of the lime and make up for the deficiency in the original supply. Similarly, in those districts where the raw materials include limestone which is excessive in calcium carbonate, the separating of the ingredients in the manner described makes available a quantity of limestone which can be withdrawn from the mixture and discarded or sold as a by-product. In both instances, it is possible to exercise close control of the iron content in the final mixture so that the iron can be employed to replace a part of the alumina and advantage taken of its fluxing characteristics to reduce kiln temperatures without the iron being present to an extent such that it would be a detriment, as, for example, by discoloring the cement.

As an illustration of the actual operation of my method, I will explain its use in connection with raw materials which are now considered unusable in cement manufacture and which are available in quantity. The rock to which I refer is described as a metamorphosed micaceous limestone which is thought to be of the same geological age as the Lehigh Valley rock. It is deficient in calcium carbonate, and the micaceous material, which is relatively fine, is a usable source of silicate of alumina. The rock also contains free silica in the form of quartz present in excessive quantities and much of the quartz is clearly visible although it is also present in the form of minute crystals heretofore thought to be "combined" but clearly shown to be free by microscopic analysis of the pulverized rock. Free iron is present as iron oxide and microscopic analysis has shown the presence of free calcite and silicate of alumina.

While it will be apparent from the analyses later to be given that this material cannot be employed for the manufacture of cement in accordance with the processes known heretofore without the addition of limestone in the form of substantially pure calcite, I have succeeded in producing standard Portland cement of the highest quality and uniformity from this material by my new method. Cement thus produced is of equal quality and strength with cements made from much superior materials of the same district carefully blended by the wet process. The cement made was intentionally designed to be a standard Portland cement rather than one of special quality and tests of seven-day briquettes made from it have shown the cement to have an average tensile strength fifty pounds above standard specifications.

The analysis of the material as quarried is as follows:

```
SiO2 ----------------------------------- 17.20
*R2O3 ----------------------------- (68.80) 38.55
CaO ------------------------------------ 6.66
MgO ------------------------------------ 2.89
Loss ----------------------------------- 31.36
Ratio ---------------------------------- 2.59
```

*Iron and alumina.

It would be impossible to manufacture a usable cement from these materials without additions, as the clinker would be of the following analysis:

```
SiO2 ----------------------------------- 26.34
R2O3 ----------------------------------- 10.19
CaO ------------------------------------ 59.03
MgO ------------------------------------ 4.44
Ratio ---------------------------------- 2.59
```

In burning the material, the coal used is assumed to contain 100 pounds per barrel and to produce 10% ash of the following average composition:

```
SiO2 ----------------------------------- 69.00
R2O3 ----------------------------------- 30.00
CaO ------------------------------------ 3.00
MgO ------------------------------------ 2.00
Ratio ---------------------------------- 2.00
```

Assuming that there is present one part of coal ash of the above composition to 37 parts of cement of the clinker analysis above set forth, the final analysis after burning is as follows:

```
SiO2 ----------------------------------- 27.22
R2O3 ----------------------------------- 10.71
CaO ------------------------------------ 57.55
MgO ------------------------------------ 4.37
Ratio ---------------------------------- 2.54
```

When the gypsum customarily used is added, the lime content set forth in the last analysis table will be reduced to approximately 2%, and the impossibility of manufacturing a usable cement from the original materials will be apparent.

For a better understanding of the application of my new method to the treatment of the above materials in the production of a synthetic true Portland cement of the highest quality and strength, reference may be had to the accompanying drawing, in which Fig. 1 is a flow diagram showing the preferred method of handling the materials, and Fig. 2 is a flow diagram of a slightly modified application of the method useful in connection with the same materials and somewhat simpler but not affording as precise control as the preferred form of carrying out the method.

In carrying out the method in its preferred form as illustrated in Fig. 1, the raw materials after passing through the preliminary crushers are preliminarily reduced in hammer mills, Bradley mills or the like. The material is then ready for final grinding in accordance with the usual single or two-stage practice, but in order to reduce the cost of grinding and increase the useful capacity of the milling equipment, I prefer to increase the tube mill feed for the rock condition previously described. This makes it possible to discard the free silica before power is expended upon it to reduce it to a further degree of fineness. The physical characteristics of the rock being treated are such that if the finish mills are adjusted so that 70% of the ground product will pass a 200-mesh screen, 50% will be of about 325-mesh fineness. In the fines thus produced, the proportion of calcium carbonate to silica will increase beyond that given in the original analysis because the quartz is harder and more difficult to grind. Advantage may be taken of this fact to reduce the grinding costs.

Because of the ease of control and the possibility of increasing the accuracy of the mixture and the distribution and contact of the ultimate particles and also because of the accuracy of present dry blending methods, it is advantageous to carry on the present process in accordance with the dry practice, but it is to be understood, however, that the process is equally applicable to wet practice.

When dry practice is followed, the discharge from the tube mills or other fine grinding mills is passed through air separators so adjusted that 50% of the output constituting the fines referred to above and of 325 mesh sizes will be sent either directly to the kilns or to blending tanks, if further mixture is necessary. The remaining 50% or tailings is then subjected to the separation process to segregate the constituents. For wet grinding, classifiers are used to obtain the fines and the ta'lings.

In the separation process, I separate the calcite from the quartz and other forms of free silica by flotation and I carry on the flotation under such conditions that the calcite is floated while the residue contains the sil'ca and materials such as iron which can be further separated from the silica by concentration operations. The flotation is carried out in flotation cells of the usual construct'on with normal flotation agents, and as the tailings which enter the cells are free from slimes, the flotation operation in itself adds but little to the cost of production of the cement.

While various flotation treatments may be used, I have found it satisfactory to form a pulp with an excess of water so that useless and deleterious materials, such as graphite and alkalies, may be removed by decantation as the excess of water overflows. The flotation agents which I have found most satisfactory for the purpose are substantially equal parts of oleic acid and cresol, the use of approximately 1½ pounds of the total agents per ton of tailings treated making it possible to effect a satisfactory recovery of the calcite. In some instances, the calcite recovery may be increased by a second flotation operation which can be carried on without undue expense, and by concentrating the residue a pure form of silica is obtainable as a by-product.

The materials deposited in the flotation cells may be separated preferably by means of a concentration table and this operation makes available to the chemist other essential ingredients which he can return to the final grinding mills in such amounts as to give the fines to be burned the desired ultimate analysis. Iron is one of the residual materials which can be readily separated from the other materials present in the residue by concentration and by thus separating the iron, an accurate control of this ingredient in the final mixture is provided and I can employ in the final mixture the maximum theoretical quantity of iron permissible. I may thus take advantage of its fluxing effect permitting reduced kiln temperatures without any danger of using it in amounts which would result in discoloration of the finished cement. Thus, my method makes it possible to employ the most favorable silica-iron-alumina ratio in the mixture to be burned.

If it is essential that the available iron in the tailings be completely recovered, the concentration of the iron may be carried on prior to flotation but if this is not essential, it is preferable to perform the concentration operation after the calcite has been removed by flotation since thus a less quantity of materials need be handled on the concentration table.

In the treatment of the particular raw material of which the analysis is given above, iron is not present in excessive quantities but the amount of iron in the final mixture is suitable for useful purposes. Accordingly, in this instance, the iron deposited as residue may be discarded, as the cost of segregating and returning it is not warranted.

After the separation of the calcite by flotation, the water is removed from it by the usual methods, so that it can be returned to the tube mills as a part of the feed. The additional calcite is then ground and reduced to ultimate fineness in the presence of the other constituents and this produces a high degree of mixture and contact between particles and insures a satisfactory reaction during the process of burning. If the wet process is employed, drying of the recovered calcite is, of course, unnecessary.

As the so-called inferior raw materials, which I contemplate using in producing cement in accordance with my new method, contain all the essential ingredients of the ultimate mixture but in improper proportions, the economy of the flotation and concentration operations as above described will be apparent. It is unnecessary in accordance with this method in the treatment of such materials to subject all the materials being processed to flotation or concentration and only such amounts of the materials will be subjected to the separating operations as are required to produce the quantities of the constituents which are needed for return or for discarding in order to bring the ultimate mixture to the desired analysis. In the example given, 50% of the tailings are subjected to separation, but with rocks of other analyses, a greater or less amount of the materials will be so treated depending upon the composition of the rock. In any event, the flotation with or without concentration is much less costly for the production of an ultimate mixture than the current practice of forming such a mixture of proximate analysis by admixtures of materials obtained from other sources, and the cost of the separation operations is more than compensated for by the saving in the cost of grinding and burning.

The analyses given below illustrate the result of processing the original materials in the manner previously described:

|  | Original—2 parts | Concentrates 2nd treatment— 1 part |
|---|---|---|
| $SiO_2$ | 17.20 | 2.10 |
| $R_2O_3$ | 6.66 | 3.30 |
| CaO | 38.55(68.80) | 49.64(88.60) |
| MgO | 2.89 | 2.60 |
| Loss | 31.36 | 41.29 |
| Ratio | 2.59 | .63 |

In the above table, the so-called "two-parts" represent the fines discharged from the tube mills and constituting 50% of the original total quantity and the so-called "one-part" constitutes one-half of the original tailings. The total quantity of the final mixture is accordingly only ¾ of the materials discharged from the preliminary grinding mills in the example given, although it is to be understood that the necessary relation of the "parts" will vary throughout wide ranges depending upon the analyses of the original material and in most instances will involve fractional variations over wide ranges.

The ultimate analysis of the raw material mixture is as follows:

| | |
|---|---|
| $SiO_2$ | 19.38 |
| $R_2O_3$ | 5.54 |
| CaO | 42.24  (75.40) |
| MgO | 2.79 |
| Loss | 34.67 |
| Ratio | 2.19 |

Cement produced from the above mixture in a gas-fired kiln shows the following analysis:

| | |
|---|---|
| $SiO_2$ | 19.38 |
| $R_2O_3$ | 8.83 |
| CaO | 67.33 |
| MgO | 4.44 |
| Ratio | 2.19 |

Allowing for coal ash composition, the composite analysis is as follows:

|  | Cement— 37 parts | Coal ash— 1 part |
| --- | --- | --- |
| SiO₂ | 19.38 | 60.00 |
| R₂O₃ | 8.83 | 30.00 |
| CaO | 67.33 | 3.00 |
| MgO | 4.44 | 2.00 |
| Ratio | 2.19 | 2.00 |

The ultimate analysis of the clinker prior to the addition of gypsum is:

| SiO₂ | 20.44 |
| R₂O₃ | 9.38 |
| CaO | 65.63 |
| MgO | 4.37 |
| Ratio | 2.17 |

The lime content is reduced to approximately 63.60 by the addition of gypsum and the absorption of moisture.

From the above analyses, it will be apparent that the cement produced is of high lime saturation and will have strength characteristics which are excellent and substantially above standard specifications, although the cement has been produced from a raw material heretofore considered useless.

A modification of the process above-described is illustrated by the flow sheet forming Figure 2 and this modification involves a departure from the preferred practice with respect to the flotation of the calcite and the separation by concentration of the flotation residue. The separation is carried on before the floated and recovered materials are delivered to the final grinding mills and this procedure is somewhat simpler and may be adopted because of savings in cost.

The analysis of the raw materials under discussion indicates that approximately 25% of the materials can be discarded as excess silica and iron, and in carrying out the modified form of the method, the raw materials from the primary crushers are reduced by preliminary reduction methods which complete the reduction with a minimum of fines, so that the material to be floated will be substantially free from slimes. For this purpose, it is satisfactory to employ a 48-mesh hammer mill reduction. If the preliminary grinders which are employed cannot be so regulated that fines will not be present, air separation can be used but this step in the method is not included in the flow sheet.

In the treatment of the specific material of which the analysis is given, the product of the preliminary grinders is divided into two equal parts and one part is sent without modification to the final grinding mills, which may be tube mills, where it is reduced to kiln feed size.

The other part is then passed to the flotation cells and the relatively coarse calcite is floated and then sent to the tube mills. Since the analysis indicates a deficiency in calcite, all the calcite recovered is returned to bring the ratio up to the desired point, but, if a greater proportion of calcite were present in the composition, either more of the original material would be sent directly to the tube mills or less than the full amount of calcite floated would be delivered to these mills. The practice to be followed in this connection depends upon the relative amounts of the other ingredients and one practice or the other may be adopted in accordance with local conditions to obtain the most favorable ratios within economic limitations. It is, of course, advantageous to subject to flotation the smallest possible proportion of the original materials that will produce a sufficient quantity of such constituents to make up for deficiencies in the original composition.

In the material under discussion, the iron-alumina content of the original fine ground materials is such that the residue from the flotation cells may be discarded, but if the original material used is one in which the iron in the fines is deficient in quantity, it will be recovered by a concentrator and returned as tube mill feed in the proper amount. In some locations, there is a market for iron-silica and the other materials which can be separated by concentration and it may be profitable to carry out this operation for that reason, even though the materials are not needed in the manufacture of cement.

The modified form of the method is particularly advantageous in connection with wet practice since the floated calcite can be returned to the tube mill without drying. Also, it is simple, and in some localities the materials have grinding characteristics such that the grinding cost may be less in carrying out the modified method than in the practice of the preferred form.

The modified method has a disadvantage as compared with the preferred form in that there is a decrease in the accuracy of the control together with a possible decrease in the lime saturation of the clinker. The explanation of this is that when the hammer mill feed is divided as described, the ultimate fine material will contain a relatively greater quantity of free silica, as compared with the fine material produced in the preferred form of the method, and accordingly the same completeness of reaction during burning does not take place. In the preferred form of the method, the reduction in the tube mill and the air separation result in a greater removal of silica as tailings because it is more difficult to grind the silica than the other constituents.

The method as illustrated in Figure 2 can be applied to either wet or dry practice and when dry practice is followed, closed circuit grinding can be used to obtain greater economy and better control of size without interfering with the practice of the method.

While the new method in its two forms has been described in detail for purposes of explanation in connection with a rock of a specific analysis which is inferior because of its lime deficiency, the application of the method to the treatment of other rocks will be evident to the cement chemist. In both forms of the method, the same principle is involved, namely, the use of the rock itself as a source of supply of essential ingredients obtained by separation, these ingredients being made available by such procedure so that they may be returned in proper amount or discarded to correct variations in the raw material supply from the desired final analysis. Also, in both forms of the new method, flotation and concentration are used as the specific practices for obtaining the supplies of the ingredients and the separation is carried out in connection with the grinding operations under such conditions as to reduce the grinding cost, the saving in this operation more than compensating for the expense of the separation and thus effecting a reduction in the total cost of manufacturing the cement.

In the foregoing description of the new method, I have explained its use in connection with the preparation of final mixtures suitable for burning from available inferior materials without adding thereto materials obtained from outside sources to vary the composition. It is to be understood, however, that with certain available materials it may be advisable for reasons of economy to segregate the constituents of those materials as above described to obtain a supply of the constituents which may be disposed of appropriately to correct ratios and to build up deficiencies of certain constituents but not necessarily to the full theoretical proportions of those constituents. In such instances, the deficiency of a constituent may be completely made up, in part by employing segregated quantities of the constituent and in part by adding quantities of the constituent obtained from an outside source. Such a procedure thus involves the practice of the invention coupled with a limited use of the prior practice. In such procedure, the extent to which outside materials are used will be determined by considerations of economy and more or less of the outside material will be used to obtain the best overall cost of production.

What I claim is:

1. The method of preparing a cement raw material mixture approaching a predetermined analysis from original material containing the essential constituents of said mixture but with at least one essential constituent present in a proportion in excess of that called for in said analysis, which comprises reducing a quantity of the original material to workable sizes, treating at least a part thereof to separate the said constituent, discarding the separated constituent, and combining the remainder of the treated part with the untreated part of said original material.

2. The method of preparing a cement raw material mixture approaching a predetermined analysis from original material containing the essential constituents of said mixture but with at least one essential constituent present in a proportion in excess of that called for in said analysis, which comprises reducing the original material to workable sizes, treating at least a part thereof to separate the said constituent, discarding a quantity of the separated constituent equal to an amount by which it is in excess, and combining the remainder of the said separated constituent, the remainder of the treated part of the original material and the untreated part of said material.

3. The method of preparing a cement raw material mixture approaching a predetermined analysis from original material containing the essential constituents of said mixture but with at least one essential constituent present in a proportion in excess of that called for in said analysis, which comprises reducing the original material to workable sizes, treating at least a part thereof to separate the said constituent, discarding the separated constituent, and combining the remainder of the treated part and the untreated part of said original material, the part of said original material treated being selected so as to contain an amount of the separated constituent equal to the excess thereof in the original material.

4. The method of preparing a raw cement material mixture approximating a predetermined analysis from original material containing the essential constituent of said mixture but with at least one essential constituent, relatively difficult to grind, in a proportion in excess of that called for in said anlysis, which comprises reducing the original material at least to preliminary milling sizes, treating at least a part of the milled material to separate the said constituent, discarding the excessive quantity of said separated constituent at such sizes, combining the remainder of the treated part with the untreated part, and reducing the said parts to final sizes.

5. The method of preparing a cement raw material mixture approaching a predetermined analysis from original material containing the essential constituents thereof, but with at least one constituent in a proportion in excess of that called for in said analysis and at least one other essential constituent in a proportion less than that called for in said analysis, which comprises reducing the original material to workable sizes, treating at least a part thereof to segregate the constituent present in excess from that in which the original material is deficient, discarding the excessive quantity of said first constituent, combining the remainder of said constituent and the segregated quantity of said deficient constituent with the untreated part of said material, and reducing the combined material to final sizes.

6. The method of preparing a cement raw material mixture approaching a predetermined analysis from original material containing silica and lime and other constituents, at least one of which is present in a proportion in excess of that called for in said analysis, which comprises reducing the original material at least to preliminary reduction sizes, treating at least a part of the reduced material to separate the lime from the silica, discarding the excessive quantity of the separated constituents, and returning the remainder to the untreated part.

7. The method of preparing a cement raw material mixture closely approaching a desired analysis from original material containing the constituents silica and lime and other constituents, at least one of which is present in an excessive quantity, which comprises reducing the original material at least to preliminary reduction sizes, taking at least a part of said sizes and subjecting them to flotation to separate the lime from the silica, discarding the excessive quantity of the constituents so separated, and returning the remainder to the other part to bring the final mixture up to the said desired analysis.

8. The method of preparing a cement raw material mixture approaching a predetermined analysis from original material excessive in silica and deficient in lime and containing other constituents, which comprises reducing the original material itself to preliminary reduction sizes, subjecting at least a portion of the reduced material to flotation to segregate the lime and silica, discarding the silica and combining the remainder of the treated part with the untreated part, the part treated containing such a quantity of lime and silica that the untreated part can be brought to the desired analysis by combining therewith the treated part after discarding the silica therefrom, and grinding the combined and treated and untreated parts to final reduction sizes.

9. The method of preparing a cement raw material mixture of a predetermined analysis from an original material containing the essential constituents in undesirable proportions and ratios for the process of burning, which comprises reducing the original material at least to preliminary reduction sizes, subjecting at least a part of said reduced material to flotation and concentration to segregate the constituents thereof, controlling the analysis and ratios of the final mixture by discarding the excessive quantities of the segregated constituents and returning the remainder to the untreated part.

10. The method of preparing a cement raw material mixture of a desired predetermined analysis, from an original material containing the essential constituents in undesirable proportions and ratios for the process of burning, which comprises reducing the original material at least to preliminary reduction sizes, subjecting at least a part of said reduced material to flotation and concentration to segregate the constituents thereof, controlling the analysis and ratios of the final mixture by discarding the excessive quantities of constituents so segregated and returning the remainder to the untreated part, and reducing said mixture to final sizes suitable for burning.

11. The method of preparing a cement raw material mixture approaching a desired predetermined analysis from original material containing the constituents lime, silica and iron, but in improper proportions and ratios for burning, particularly deficiencies in lime and iron and excesses in silica, which comprises reducing the original material at least to preliminary reduction sizes, subjecting at least a part of said reduced material to flotation and concentration to segregate the constituents thereof, discarding the excessive quantity of segregated silica and returning the remainder to the untreated part.

12. The method of preparing a cement raw material mixture approaching a desired predetermined analysis from original material containing the constituents lime, silica and iron, but in improper proportions and ratios for burning, particularly deficiencies in lime and iron and excesses in silica, which comprises reducing the original material at least to preliminary reduction sizes, subjecting at least a part of said reduced material to flotation and concentration to segregate the constituents thereof, discarding the excessive quantity of segregated silica returning the remainder to the untreated part, and grinding the returned lime and iron to the final sizes with the untreated part.

13. The method of preparing a cement raw material mixture approaching a predetermined analysis from original material containing at least one hard constituent difficult to grind and in excessive quantity, which comprises reducing the material to preliminary reduction sizes, further grinding said material in fine grinding mills, removing the material from said mills before complete final reduction is made, removing from the material the fines suitable for burning, subjecting the tailings to flotation to segregate the constituents, discarding the excessive quantity of said hard constituent, and returning the remainder to the fine grinding mills for final reduction.

14. The method of preparing a cement raw material mixture of predetermined analysis from an original material excessive in silica and deficient in lime, which comprises reducing the material to preliminary size, grinding the reduced material in final grinding mills and removing it therefrom prior to complete final reduction, removing the sizes suitable for burning, subjecting the tailings to flotation to segregate the lime from the silica, discarding the excessive quantity of silica, and returning the remainder to said final grinding mills for further reduction with the original material being ground.

15. The method of preparing a cement raw material mixture approaching a desired theoretical analysis from an original material containing the essential constituents in unfavorable proportions and ratios for burning, particularly lime, silica, and iron, which comprises reducing the original material to preliminary sizes, further grinding the material in fine grinding mills but removing it therefrom prior to complete reduction, separating the fine sizes suitable for burning from the tailings, subjecting the tailings to flotation to segregate the constituents, discarding the constituents present in the original material in excessive quantity and returning the remainder of the constituents so segregated to the fine grinding mills to bring the mixture up to the desired theoretical analysis.

16. The method of preparing a cement raw material mixture approaching a desired theoretical analysis from original material excessive in silica and deficient in lime and iron, which comprises reducing the material to preliminary size, grinding the reduced material in fine grinding mills, and removing it therefrom when the quantity of silica in the fines approaches the proper percentage proportion for the final mixture, separating the fines from the tailings, subjecting the tailings to flotation to segregate silica, discarding the silica, and returning the remainder to the fine grinding mills to bring the lime and iron in the final mixture up to the desired analysis.

CHARLES H. BREERWOOD.

CERTIFICATE OF CORRECTION.

Patent No. 1,931,921.  October 24, 1933.

CHARLES H. BREERWOOD.

It is hereby certified that error appears in the printed specification of the above numbered patent requiring correction as follows: Page 4, line 137, for "19.38" read "12.16"; and that the said Letters Patent should be read with this correction therein that the same may conform to the record of the case in the Patent Office.

Signed and sealed this 14th day of November, A. D. 1933.

F. M. Hopkins (Seal)  Acting Commissioner of Patents.

10. The method of preparing a cement raw material mixture of a desired predetermined analysis, from an original material containing the essential constituents in undesirable proportions and ratios for the process of burning, which comprises reducing the original material at least to preliminary reduction sizes, subjecting at least a part of said reduced material to flotation and concentration to segregate the constituents thereof, controlling the analysis and ratios of the final mixture by discarding the excessive quantities of constituents so segregated and returning the remainder to the untreated part, and reducing said mixture to final sizes suitable for burning.

11. The method of preparing a cement raw material mixture approaching a desired predetermined analysis from original material containing the constituents lime, silica and iron, but in improper proportions and ratios for burning, particularly deficiencies in lime and iron and excesses in silica, which comprises reducing the original material at least to preliminary reduction sizes, subjecting at least a part of said reduced material to flotation and concentration to segregate the constituents thereof, discarding the excessive quantity of segregated silica and returning the remainder to the untreated part.

12. The method of preparing a cement raw material mixture approaching a desired predetermined analysis from original material containing the constituents lime, silica and iron, but in improper proportions and ratios for burning, particularly deficiencies in lime and iron and excesses in silica, which comprises reducing the original material at least to preliminary reduction sizes, subjecting at least a part of said reduced material to flotation and concentration to segregate the constituents thereof, discarding the excessive quantity of segregated silica returning the remainder to the untreated part, and grinding the returned lime and iron to the final sizes with the untreated part.

13. The method of preparing a cement raw material mixture approaching a predetermined analysis from original material containing at least one hard constituent difficult to grind and in excessive quantity, which comprises reducing the material to preliminary reduction sizes, further grinding said material in fine grinding mills, removing the material from said mills before complete final reduction is made, removing from the material the fines suitable for burning, subjecting the tailings to flotation to segregate the constituents, discarding the excessive quantity of said hard constituent, and returning the remainder to the fine grinding mills for final reduction.

14. The method of preparing a cement raw material mixture of predetermined analysis from an original material excessive in silica and deficient in lime, which comprises reducing the material to preliminary size, grinding the reduced material in final grinding mills and removing it therefrom prior to complete final reduction, removing the sizes suitable for burning, subjecting the tailings to flotation to segregate the lime from the silica, discarding the excessive quantity of silica, and returning the remainder to said final grinding mills for further reduction with the original material being ground.

15. The method of preparing a cement raw material mixture approaching a desired theoretical analysis from an original material containing the essential constituents in unfavorable proportions and ratios for burning, particularly lime, silica, and iron, which comprises reducing the original material to preliminary sizes, further grinding the material in fine grinding mills but removing it therefrom prior to complete reduction, separating the fine sizes suitable for burning from the tailings, subjecting the tailings to flotation to segregate the constituents, discarding the constituents present in the original material in excessive quantity and returning the remainder of the constituents so segregated to the fine grinding mills to bring the mixture up to the desired theoretical analysis.

16. The method of preparing a cement raw material mixture approaching a desired theoretical analysis from original material excessive in silica and deficient in lime and iron, which comprises reducing the material to preliminary size, grinding the reduced material in fine grinding mills, and removing it therefrom when the quantity of silica in the fines approaches the proper percentage proportion for the final mixture, separating the fines from the tailings, subjecting the tailings to flotation to segregate silica, discarding the silica, and returning the remainder to the fine grinding mills to bring the lime and iron in the final mixture up to the desired analysis.

CHARLES H. BREERWOOD.

CERTIFICATE OF CORRECTION.

Patent No. 1,931,921.   October 24, 1933.

CHARLES H. BREERWOOD.

It is hereby certified that error appears in the printed specification of the above numbered patent requiring correction as follows: Page 4, line 137, for "19.38" read "12.16"; and that the said Letters Patent should be read with this correction therein that the same may conform to the record of the case in the Patent Office.

Signed and sealed this 14th day of November, A. D. 1933.

F. M. Hopkins
Acting Commissioner of Patents.

(Seal)

CERTIFICATE OF CORRECTION.

Patent No. 1,931,921.                                October 24, 1933.

CHARLES H. BREERWOOD.

It is hereby certified that error appears in the printed specification of the above numbered patent requiring correction as follows: Page 4, line 137, for "19.38" read "12.16"; and that the said Letters Patent should be read with this correction therein that the same may conform to the record of the case in the Patent Office.

Signed and sealed this 14th day of November, A. D. 1933.

F. M. Hopkins (Seal)                                        Acting Commissioner of Patents.